United States Patent [19]

Tezuka et al.

[11] Patent Number: 5,004,064
[45] Date of Patent: * Apr. 2, 1991

[54] TRACTION CONTROL SYSTEM FOR A FOUR-WHEEL DRIVE MOTOR VEHICLE

[75] Inventors: Kazunari Tezuka; Haruo Fujiki, both of Tokyo, Japan

[73] Assignee: Fuji Jukogyo Kabushiki Kaisha, Tokyo, Japan

[*] Notice: The portion of the term of this patent subsequent to Mar. 26, 2008 has been disclaimed.

[21] Appl. No.: 260,802

[22] Filed: Oct. 20, 1988

[30] Foreign Application Priority Data

Oct. 27, 1987 [JP] Japan ................................ 62-271003

[51] Int. Cl.⁵ .............................................. B60K 23/08
[52] U.S. Cl. ..................... 180/197; 180/248; 364/426.02; 364/426.03
[58] Field of Search ............... 180/247, 248, 249, 250, 180/197, 233; 364/424.1, 426.01, 426.02, 426.03

[56] References Cited

U.S. PATENT DOCUMENTS

| 4,709,775 | 12/1987 | Watanabe et al. | 364/424.1 |
| 4,760,893 | 8/1988 | Sigl et al. | 364/426.02 |
| 4,765,691 | 8/1988 | Inoue et al. | 180/197 |
| 4,766,973 | 8/1988 | Kashihara | 180/249 |
| 4,771,850 | 9/1988 | Matsuda | 180/233 |
| 4,776,421 | 10/1988 | Kashihara | 180/197 |
| 4,849,891 | 7/1989 | Krohn | 180/197 |
| 4,866,625 | 9/1989 | Kawamoto et al. | 364/426.02 |

FOREIGN PATENT DOCUMENTS 62-87630 4/1987 Japan .

Primary Examiner—Charles A. Marmor
Assistant Examiner—Anne Marie Boehler
Attorney, Agent, or Firm—Martin A. Farber

[57] ABSTRACT

A torque distribution deciding control unit, a planetary gear device as a central differential and an oil hydraulic clutch having opposite disks are provided on a motor vehicle. The clutch is disposed between output members of the planetary gear device, whereby torque is transmitted to front and rear wheels at a distribution ratio decided by clutch torque of the clutch. The control unit operates the clutch so as to distribute the torque at a ratio in accordance with slipping of the front or rear wheels with respect to each other so as to reduce the torque for the slipping wheels.

10 Claims, 5 Drawing Sheets

TRACTION CONTROL SYSTEM FOR A FOUR-WHEEL DRIVE MOTOR VEHICLE

BACKGROUND OF THE INVENTION

The present invention relates to a system for controlling the traction of wheels of a four-wheel drive vehicle having a central differential, which is called a full time four-wheel drive vehicle.

In a four-wheel drive, vehicle, slipping, will occur either of front wheels as a set or rear wheels as a set or all of the four wheels. The slipping of the sets of front wheels or rear wheels can be prevented by locking the central differential. However, since the differential operation is restrained, cornering ability deteriorates. Further, when the central differential is locked, slipping of the wheels can not be detected, so that it is impossible to provide automatic control to release the locking of the differential. Accordingly, the differential is manually operated to release the lock at driving on a snowy road having a low friction coefficient $\mu$.

Recently, a torque split control system has been provided for controlling the distribution ratio of torque of the engine to the front and rear wheels, when the front wheels or rear wheels slip. For example, if the front wheels slip, the torque split control system operates to increase the torque applied to the rear wheels, so that slipping of the front wheels is prevented. Thus, the vehicle can be driven around a corner with the differential operation.

However, although two-wheel slip can be prevented by controlling the torque distribution ratio, slipping of all of the four wheels can not be prevented by the torque split control. In order to restrain the slipping of the four wheels, for example, the power of the engine is reduced to decrease the traction.

Japanese Patent Application Laid-Open 62-87630 discloses a traction control system. When drive wheels spin, the power of the engine is reduced to decrease the traction, so that spinning of the wheels can be prevented. When the drive wheels spin at a low vehicle speed, reduction of the power of the engine is not allowed so as to ensure starting characteristic.

However, in such a system, since a throttle valve is frequently controlled, the power of the engine becomes unstable. At starting the vehicle, the traction control is not performed, so that spinning of the wheels at starting can not be restrained. Accordingly, it is difficult to prevent the four wheels from spinning only by traction control.

SUMMARY OF THE INVENTION

An object of the present invention is to provide a traction control system for a four-wheel drive vehicle which can prevent slipping of four wheels and stably ensure the power of the engine.

According to the present invention, there is provided a power transmitting system for a four-wheel drive vehicle having a central differential for splitting the torque of an engine at a predetermined ratio, power trains for transmitting the split torques to front and rear wheels of the vehicle, and a split control device including a clutch provided between output members of the central differential, for changing the distribution ratio of the torques transmitted to front and rear wheels.

The system comprises detecting means for detecting driving conditions of the vehicle including speeds of the front and rear wheels and speed of the vehicle and for producing condition signals dependent on the detected conditions, deciding means responsive to the condition signal for determining a desired torque distribution ratio and producing a distribution ratio signal representing the desired torque distribution ratio, two-wheel slip detecting means responsive to the condition signals for producing a two-wheel slip signal when either of the front wheels or rear wheels are slipping, four-wheel slip detecting means responsive to the condition signals at nonexistence of the two-wheel slip signal for producing a four-wheel slip signal, first actuator means responsive to the two-wheel slip signal for engaging the clutch so as to reduce the split torque to the slipping wheels, and second actuator means responsive to the four-wheel slip signal for reducing opening degree of a throttle valve of the engine.

In an aspect of the invention, the clutch is an oil hydraulic clutch having opposite disks which operates to transmit torque from the disks of higher speed to the disks of lower speed and by the pressure supplied to the clutch, and the central differential is a planetary gear.

The other objects and features of this invention will become understood from the following description with reference to the accompanying drawings.

DETAILED DESCRIPTION OF THE PREFERRED EMBODIMENT

Figure 1:
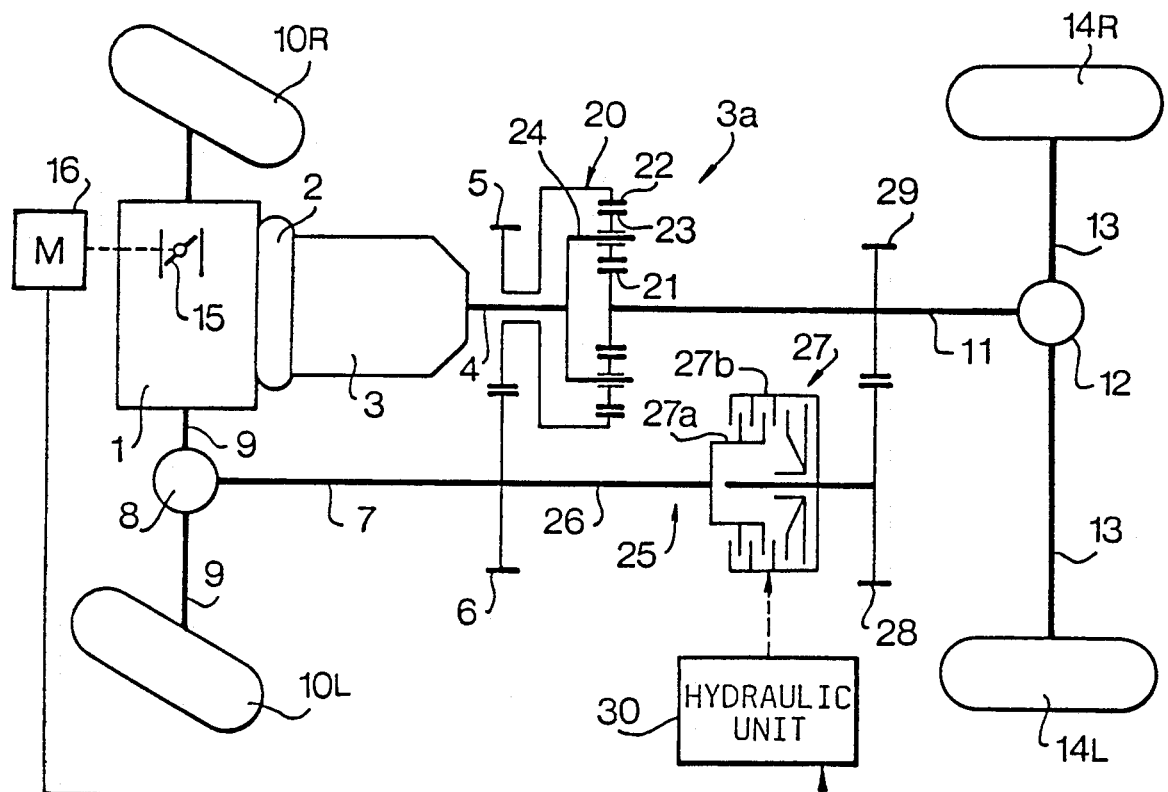
FIG. 1 is a schematic diagram showing a system according to the present invention.
Figure 1:
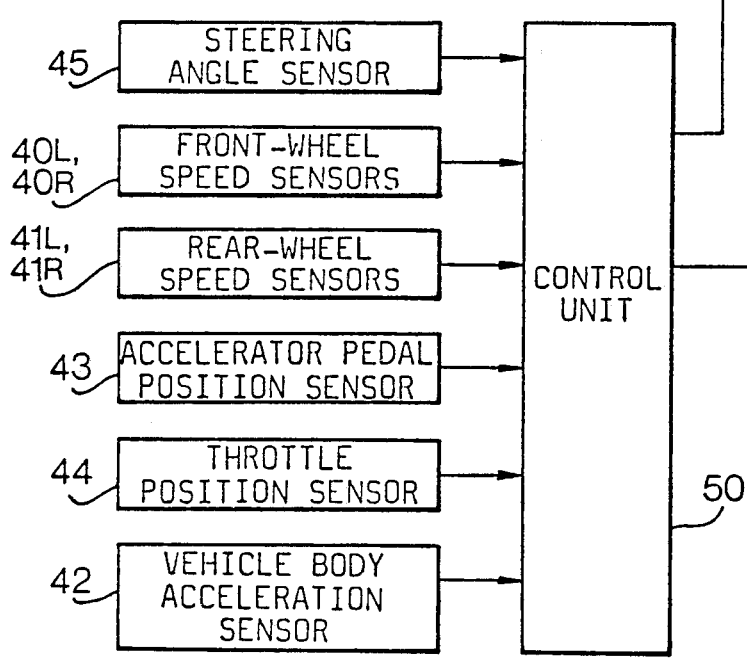

Referring to FIG. 1 showing a power transmission system for a four-wheel drive vehicle, reference numeral 1 designates an engine mounted on a front portion of the vehicle. The power of the engine 1 is transmitted to a transfer device 3a through a torque converter 2 and an automatic transmission 3. In the transfer device 3a, rotation of an output shaft 4 of the transmission 3 is transmitted to a central differential 20. The central differential 20 is a planetary gear device and comprises a sun gear 21, a ring gear 22 having internal teeth, a carrier 24, and planet pinions 23 rotatably supported on the carrier and engaged with both gears 21 and 22. The carrier 24 is connected with the output shaft 4. The ring gear 22 is connected to the gear 5 rotatably mounted on the shaft 4 and in mesh with a gear 6 having the same diameter as the gear 5 and fixedly mounted on a front drive shaft 7. The front drive shaft 7 is operatively connected to a front differential 8 so as to drive front wheels 10R and 10L through axles 9. On the other hand, the sun gear 21 is fixedly mounted on a rear drive shaft 11 so as to drive rear wheels 14R and 14L through a rear differential 12 and axles 13. Thus, the central differential 20 operates to split the torque of the engine at a ratio determined by the gear ratio thereof. The split torque is distributed to the front and rear wheels by the transfer device 3a as described hereinafter. The difference between speeds of front and rear wheels is absorbed by the central differential.

In the present arrangement of the transmission system, since static load on front part of the vehicle is larger than that of rear part, the central differential 20 is adapted to transmit a large torque to the front wheels through the ring gear 22 having a large diameter and to transmit a smaller torque to the rear wheels through the sun gear 21 having a small diameter.

In the system of the present invention, a torque split control device 25 is provided over the central differential 20. The torque split control device 25 includes gears 5 and 6, a bypass shaft 26 coaxially secured to the front drive shaft 7, a gear 29 secured to the rear drive shaft 11, and a gear 28 in mesh with the gear 29. The gears 28 and 29 are arranged to have a gear ratio which is slightly smaller than 1. The shaft 26 is connected to a hub 27a of an oil hydraulic clutch 27 and gear 28 is secured to a drum 27b of the clutch 27. The clutch has a plurality of disks secured to the hub 27a and drum 27b, respectively.

The clutch 27 is arranged to transmit the torque from a higher speed disk side to a lower speed disk side. When pressurized oil is supplied to the clutch 27 from a hydraulic unit 30, a clutch torque is generated therein, thereby engaging the clutch 27. Since the drum 27b is rotated at a slightly smaller rate than the hub 27a, torque dependent on the clutch torque is transferred from the hub 27a to the drum 27b and to the rear wheels. Thus, torques $T_F$ and $T_R$ transmitted to the front and rear drive shafts 7 and 11 are respectively expressed as follows.

$$T_F = \gamma \cdot T_i - T_C$$

$$T_R = (1-\gamma) \cdot T_i + K T_C$$

where $T_i$ is input torque transmitted to the central differential 20, $\gamma$ is distribution ratio for the front wheels predetermined by the central differential 20, K is the gear ratio of gears 28, 29, and $T_C$ is the clutch torque.

Accordingly, as the clutch torque $T_c$ increases, the distribution ratio for the front torque $T_F$ becomes smaller than the distribution ratio $\gamma$. On the other hand, the distribution ratio of the rear torque $T_R$ becomes larger than the ratio $(1-\gamma)$. Thus, the torque distribution can be continuously varied.

On a throttle valve 15 of the engine 1, an actuator 16 such as a motor is attached for electrically actuating the throttle valve.

An electronic control system has left and right front wheel speed sensors 40L and 40R, left and right rear wheel speed sensors 41L and 41R, vehicle body acceleration sensor 42, accelerator pedal position sensor 43, throttle position sensor 44, and steering angle sensor 45. The vehicle body acceleration sensor 42 has a ground speed sensor and produces a vehicle body speed signal in accordance with the ground speed. A rotational speed sensor for the output shaft 4 of the transmission 3 may be used as a vehicle body acceleration sensor.

A control unit 50 which is supplied with outputs of the sensors 40 to 45 comprises deciding means responsive to these outputs and produces an output signal representing a desired torque distribution ratio which is applied to the hydraulic unit 30 to control oil pressure applied to the oil clutch 27, and an output signal which is applied to the actuator 16 to control the throttle valve 15.

Figure 2:
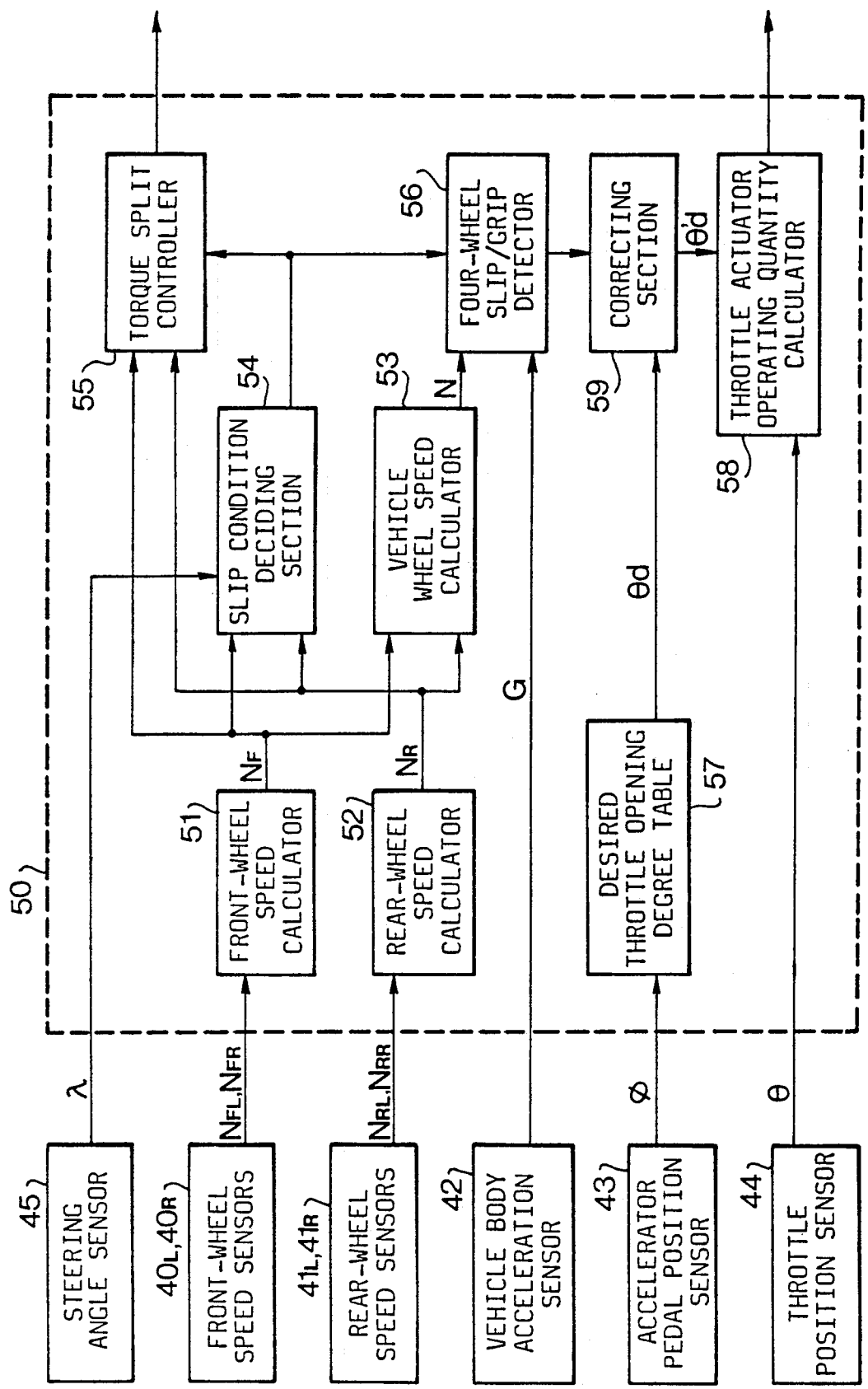
FIG. 2 shows a block diagram of a control unit of the present invention.

Referring to FIG. 2, the control unit 50 comprises a front wheel speed calculator 51 to which speeds $N_{FL}$ and $N_{FR}$ from the left and right front wheel sensors 40L and 40R are applied, and a rear wheel speed calculator 52 to which speeds $N_{RL}$ and $N_{RR}$ from the left and right rear wheel speed sensors 41L and 41R are applied. Front wheel speed $N_F$ and rear wheel speed $N_R$ are obtained from the following equations.

$$N_F = (N_{FL} + N_{FR})/2$$

$$N_R = (N_{RL} + N_{RR})/2$$

The speeds $N_F$ and $N_R$ are fed to a vehicle wheel speed calculator 53 where the average speed N of the four wheels is calculated as follows.

$$N = (N_F + N_R)/2$$

Front and rear wheel speeds $N_F$ and $N_R$ are applied to a slip condition deciding section 54 and a torque split controller 55, respectively. A steering angle $\lambda$ detected by the steering angle sensor 45 is applied to the slip condition deciding section 54 where two-wheel slip is determined in accordance with a predetermined reference value $\Gamma N_S$ determined by the steering angle $\lambda$ and the difference between front-axle speed $N_{FA}$ represented by the front wheel speed $N_F$ and rear-axle speed $N_{RA}$ represented by the rear wheel speed $N_R$. Hereinafter $N_F$ and $N_R$ may be considered $N_{FA}$ and $N_{RA}$. In the section 54, slipping of the front wheels relative to rear wheels is determined when $NF - NR > \Delta N_S$, and slipping of the rear wheels relative to front wheels is determined when $NR - NF > \Delta N_S$. Four wheels are slipping or gripping the road surface when $|NF - NR| \leq \Delta N_S$. The section 54 produces two-wheel slip signals which are applied to the torque split controller 55 and to a four-wheel slip/grip detector 56. The controller 55 provides a clutch pressure control signal in the form of pulses.

A vehicle body acceleration G detected by the vehicle body acceleration sensor 42 and the wheel speed N from the vehicle wheel speed calculator 53 are applied to the four-wheel slip/grip detector 56.

Figure 3A:
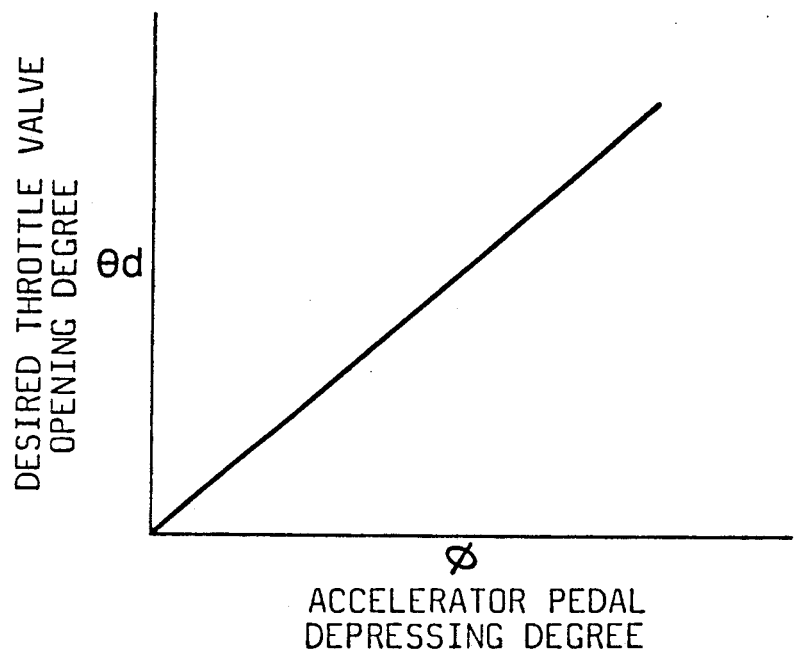
FIG. 3a is a graph showing a desired throttle valve opening degree in relation to an accelerator pedal depressing degree.

It is determined that all of the four wheels are slipping, or are gripping the road surface without slipping when the two-wheel slip signals are not generated from the section 54, where there is no difference between the front-wheel speed $N_F$ and the rear-wheel speed $N_R$. Accordingly, the four-wheel slip/grip detector 56 detects the four-wheel slip under the nonexistence of the two-wheel slip signals. A difference $\Delta G$ between the acceleration G of the vehicle body and an acceleration $G_N$ of the vehicle wheels, which is a differential of the vehicle wheel speed N, is calculated ($\Delta G = G_N - G$). When the difference $\Delta G$ is larger than a predetermined slip reference value $\Delta G_S$ ($\Delta G \geq \Delta G_S$), it is determined that the four wheels of the vehicle are slipping ($\Delta G_S > 0$). On the other hand, when the difference $\Delta G$ is smaller than a predetermined grip reference value $\Delta G_S'$ ($\Delta G \leq G_S'$), it is determined that the four wheels resume gripping of the road surface after the slipping ($\Delta G_S' < 0$). The four-wheel slip and grip may be determined in dependence on a difference $\Delta N$ between the vehicle wheel speed N and a vehicle body speed $N_G$ which is an integral of the acceleration G of vehicle body, predetermined slip reference value $\Delta N_S$ and predetermined grip reference value $\Delta N_S'$ in the same manner as the above described method. An accelerator pedal depressing degree $\emptyset$ detected by the accelerator pedal position sensor 43 is applied to a desired throttle opening degree table 57 where a plurality of desired throttle opening degrees $\theta d$, which increase with the accelerator pedal depressing degree $\emptyset$ as shown in FIG. 3a, are stored. The desired throttle opening degree $\theta d$ is applied through a correcting section 59 to a throttle actuator operating quantity calculator 58, where the actual throttle opening degree from the sensor 44 is applied. The calculator 58 produces the throttle valve control signal in depending on a deviation of the actual throttle opening degree $\theta$ from a corrected desired opening degree $\theta d$ corrected by the correcting section 59.

The desired throttle opening degree $\theta d$ is corrected in the correcting section 59 in accordance with a signal from a four-wheel slip/grip detector 56.

Figure 3B:
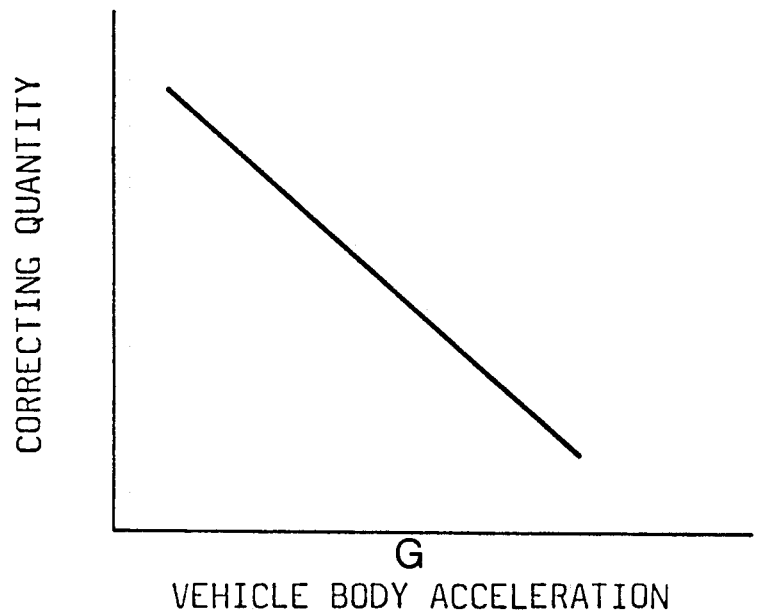
FIG. 3b is a graph showing a correcting quantity in relation to an acceleration of a vehicle body.

When a slip signal is applied to the correcting section 59, the desired throttle opening degree $\theta d$ is decreased, and when a grip signal is applied after the slipping, the original desired throttle opening degree $\theta d$ is restored. The correcting quantity is set in relation to the acceleration G of the vehicle body as shown in a graph FIG. 3b.

If the four-wheel slip occurs when the acceleration G is small, assuming that slipping rate is large on account of the low friction coefficient $\mu$ of the road surface, the throttle opening degree is largely decreased to reduce the traction.

The operation of the system is described hereinafter.

When the drive range is selected, the output torque of the engine is transmitted through the torque converter 2 and the transmission 3 to the central differential 20 at which the torque is divided to the ring gear 22 and sun gear 21, for example at a ratio 60:40, in accordance with a static load of the vehicle. The divided torques are transmitted to the front and rear drive shafts 7 and 11. At the same time, the torques are transmitted to hub 27a of the oil clutch 27 through gears 5, 6 and shaft 26 and to the drum 27b through gears 29 and 28, respectively. Since the speed of the drum 27b is reduced by the gear ratio between gears 29 and 28, the torque is transmitted from hub 27a of higher speed side to the drum 27b of lower speed side.

Figure 4A:
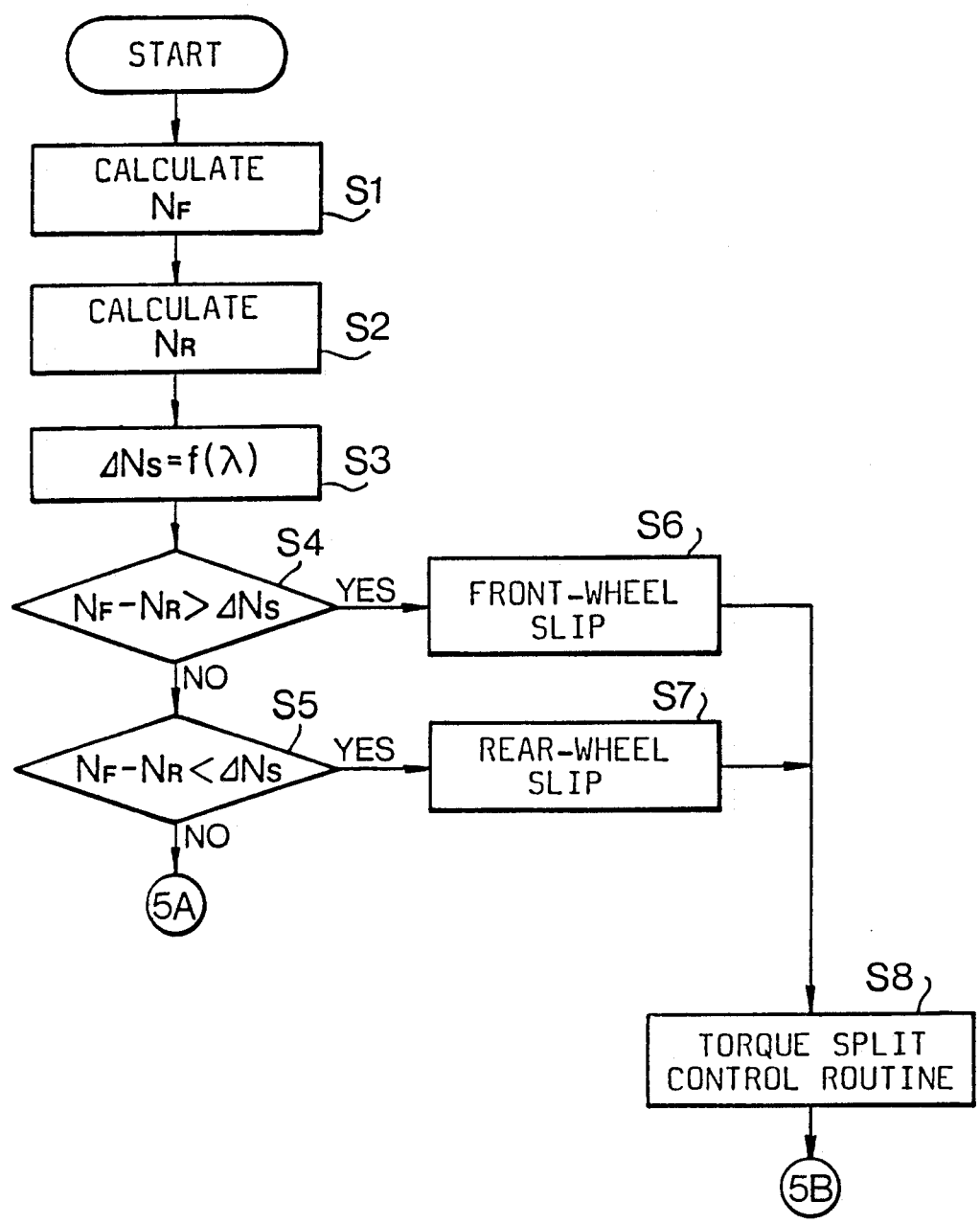
FIGS. 4a and 4b are a flowchart showing the operation of the control unit.
Figure 4B:
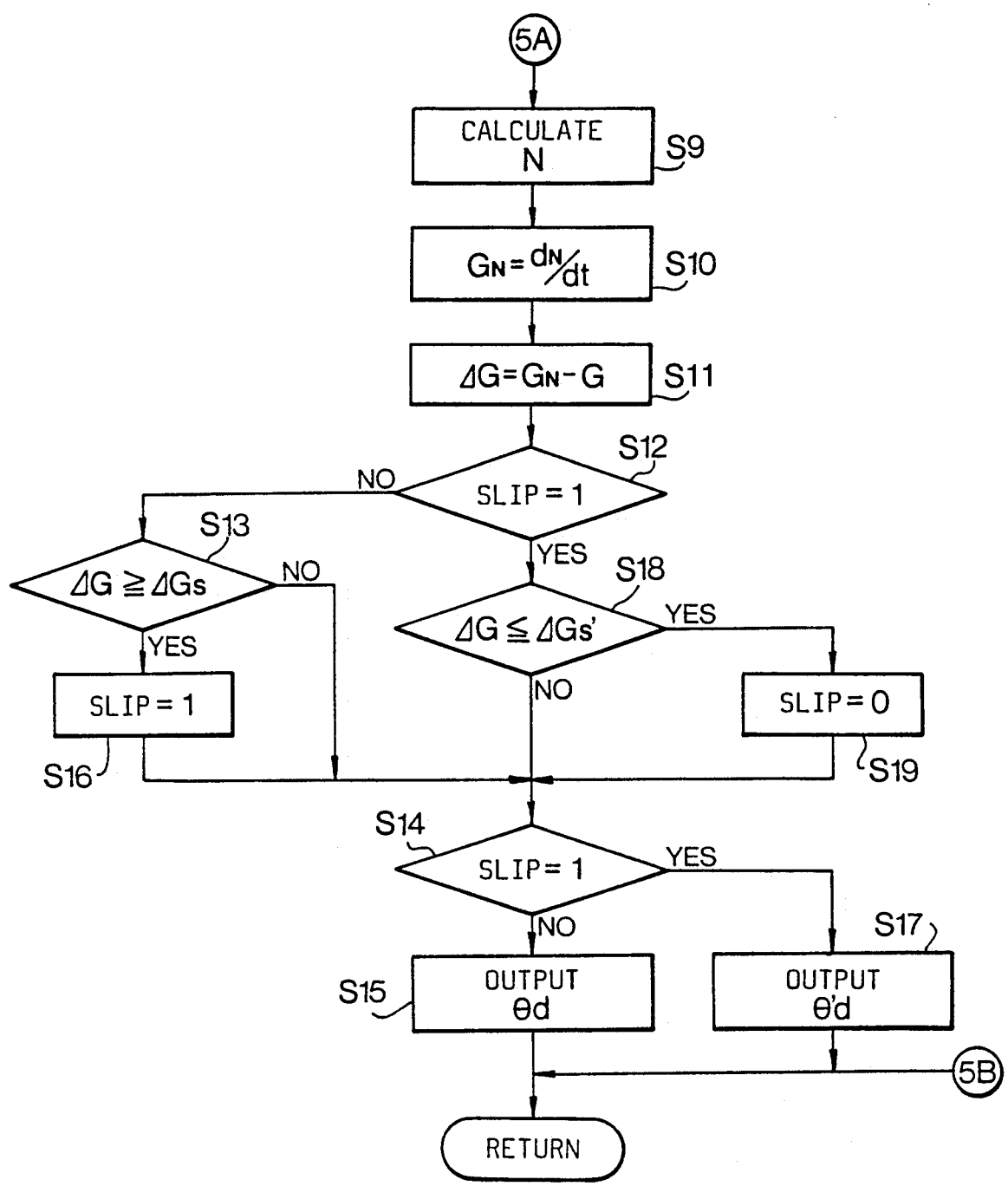

Referring to FIGS. 4a and 4b showing operation of the system, front wheel speed $N_F$ and rear wheel speed $N_R$ are calculated at calculators 51 and 52 at steps S1 and S2. The reference value $\Delta N_S$ is obtained by $\Delta N_S = f(\lambda)$ (step S3). Wheel speeds $N_F$ and $N_R$ are compared with the reference value $\Delta N_S$ in the section 54 at steps S4, S5. When slipping of the front wheels relative to the rear wheels or the rear wheels relative to the front wheels is determined in accordance with $N_F - N_R > \Delta N_S$ or $N_F - N_R < \Delta N_S$ the corresponding two-wheel slip signal is fed to the controller 55. In the torque split controller 55, the clutch pressure responsive to the slip condition is provided and the clutch pressure actuating signal is applied to the hydraulic control unit 30 for controlling the clutch torque in the clutch 27 (step S8). That is, when the front wheel speed $N_F$ is larger than the rear wheel speed $N_R$ in excess of the value $\Delta N_S$ ($N_F - N_R > \Delta N_S$), the slipping of front wheels is determined at step S6. Thus, the clutch pressure in the clutch 27 is increased and the differential operation of the central differential 20 is limited. The value (NF-NR) is converged to the value $\Delta N_S$ for cancelling the slipping.

To the contrary, when the value $(N_F - N_R)$ is smaller than the value $\Delta N_S$, slipping of the rear wheels is determined at step S7. Thus, the clutch pressure is decreased for improving the differential operation of the central differential 20. Thus, the value $(N_F - N_R)$ is converged to the value $\Delta N_S$. The torque is split by the feedback control.

If the difference between the average front wheel speeds and the average rear wheel speeds is equal to the value $\Delta N_S (N_F - N_R = \Delta N_S)$, the traction control for preventing four-wheel slip is carried out. At a step S9, vehicle wheel speed N is calculated in dependency on the front wheel speed $N_F$ and the rear wheel speed $N_R$, and at a step S10, vehicle wheel acceleration $G_N$ for example, is calculated. The difference $\Delta G$ between the wheel acceleration $G_N$ and vehicle body acceleration G is calculated at a step S11. At a step S12, it is determined whether a flag indicating the four-wheel slip was set at the last program. If the flag is not set, the difference $\Delta G$ is compared with the predetermined slip value $\Delta G_S$ at a step S13. When the difference $\Delta G$ is smaller than the value $\Delta G_S$, determining that the vehicle is steadily driven, the program goes to a step S14, where it is again determined if the flag is set or not. Since the flag is not set, the program proceeds to a step S15 where the desired throttle valve opening degree $\theta d$ derived from the table 57 is fed to the actuator operating quantity calculator 58 without any correction. Accordingly, a control signal representing the operating quantity dependent on the desired degree $\theta d$ and actual degree $\theta$ is applied to the actuator 16 of the throttle valve 15 so that the throttle valve is adjusted to the desired opening degree $\theta d$.

When the acceleration $G_N$ of the vehicle wheels is much larger than the acceleration G of the vehicle body so that the difference $\Delta G$ is larger than the slip value $\Delta G_S$, it is determined that the four wheels of the vehicle are slipping. Accordingly, the flag is set at a step S16. Determining that the flag is set at the step S14, the program goes to a step S17, where the desired opening degree $\theta d$ is reduced in the correcting section 59. The actuator operating quantity is calculated in dependency on the corrected desired opening degree $\theta d'$ and the corresponding signal is applied to the actuator 16. Consequently, the opening degree of the throttle valve 15 is decreased so as to decrease the torque of the engine 1, thereby reducing the vehicle wheel speed N and vehicle wheel acceleration $G_N$.

When the flag is detected at the step S12, the program goes to a step S18. Since the vehicle wheel acceleration $G_N$ is reduced at the previous program, the difference $\Delta G$ between the vehicle wheel acceleration $G_N$ and the vehicle body acceleration G is reduced. The difference $\Delta G$ is now compared with the predetermined grip value $\Delta G_S'$. When the difference is larger, the four wheels are slipping so that the program proceeds to the step S17 through the step S14, repeating the afore-described operation.

When the difference $\Delta G$ is smaller than the grip value $\Delta G_S'$, it is determined that the four wheels grip the road surface. The flag is reset at a step S19. Accordingly, the program goes to the step S15 through the step S14, thereby terminating the correction in the correcting section 59. Thus, the throttle valve is controlled at the desired degree $\theta d$.

In accordance with the present invention, two-wheel slip is controlled by the torque split control for distributing the torque between the front and rear wheels. Thus, the two-wheel slip is prevented and stability for the power of the engine is ensured while driveability can be improved.

Accordingly, the traction of the vehicle is decreased only at the four-wheel slip. Thus, each of the four wheels is equally and effectively prevented from slipping.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. In a power transmitting system for a four-wheel drive vehicle having a central differential for splitting torque of an engine at a predetermined ratio, power trains for transmitting the split torques from output members of the central differential to front and rear wheels respectively of the vehicle, a throttle actuator for changing opening degree of a throttle valve of the engine, and a torque split control device including a clutch provided between the output members of the central differential for changing torque distribution ratio of the torques transmitted to the front and rear wheels, the improvement in the system comprising:
   front-wheel speed sensors for detecting right and left front-wheel speeds and for producing right and left front-wheel sped signals;
   rear-wheel speed sensors for detecting right and left rear-wheel speeds and for producing right and left rear-wheel speed signals;
   first calculator means responsive to the right and left front-wheel and rear-wheel speed signals for producing a front-axle speed signal and a rear-axle speed signal;
   two-wheel slip detecting means responsive to the front-axle speed signal and the rear-axle speed signal for producing a two-wheel slip signal when the front wheels are slipping with respect to the rear wheels or the rear wheels are slipping with respect to the front wheels;
   four-wheel slip detecting means responsive to the front-axle and rear-axle speed signals and a vehicle body acceleration signal only at non-existence of the two-wheel slip signal for producing a four-wheel slip signal;
   actuator means responsive to the two-wheel slip signal for controlling engaging of the clutch controlling the torque distribution ratio so as to reduce the torque to the slipping wheels; and
   actuating means being responsive to the four-wheel slip signal for actuating the throttle actuator so as to reduce the opening degree of the throttle valve.

2. The system according to claim 1, wherein
   the clutch is an oil hydraulic clutch having opposite disks and operates to transmit torque from disks of higher speed to disks of lower speed and by pressure supplied to the clutch.

3. The system according to claim 1 wherein the central differential is a planetary gear.

4. The system according to claim 1, further comprising
   a vehicle body acceleration sensor for producing said vehicle body acceleration signal.

5. The system according to claim 4, wherein
   the four-wheel slip detecting means produces the four-wheel slip signal in dependency on the difference between the vehicle body acceleration signal and another acceleration signal representing acceleration of the vehicle wheels calculated based on the front-axle and rear-axle speed signals.

6. The system according to claim 5, wherein
   said another acceleration signal represents the derivative of an average of the front-axle and rear-axle speed signals.

7. The system according to claim 4, wherein
   the four-wheel slip detecting means produces the four-wheel slip signal in dependency on the difference between a vehicle wheel speed signal based on the front-axle and rear-axle speed signals and a vehicle body speed signal calculated as an integral of the vehicle body acceleration signal.

8. The system according to claim 7, wherein
   the vehicle wheel speed signal is an average of the front-axle and rear-axle speed signals.

9. The system according to claim 1, further comprising
   a steering angle sensor for producing a steering angle signal corresponding to steering angle; and
   means responsive to said steering angle signal for producing a reference value corresponding to said steering angle signal, said reference value being a function of the steering angle;
   said two-wheel slip detecting means is responsive to said reference value for producing said two-wheel slip signal when the difference between said front-axle and rear-axle speeds is greater or less than said reference value.

10. In a power transmitting system for a four-wheel drive vehicle having a central differential for splitting torque of an engine at a predetermined ratio, power trains for transmitting the split torques from output members of said central differential to front and rear wheels respectively of said vehicle, a throttle actuator for changing an opening degree of a throttle valve of said engine, and a torque split control device including a clutch provided between said output members of said central differential for changing torque distribution ratio of the torques transmitted to said front and rear wheels, the improvement in the system comprising:
   front-wheel speed sensors for detecting right and left front-wheel speeds and for producing right and left front-wheel speed signals;
   rear-wheel speed sensors for detecting right and left rear-wheel speeds and for producing right and left rear-wheel speed signals;
   first calculator means responsive to the right and left front-wheel speed signals and the right and left rear-wheel speed signals for producing a front-axle speed signal and a rear-axle speed signal;
   two-wheel slip detecting means responsive to said front-axle speed signal and said rear-axle speed signal for producing a two-wheel slip signal when the front wheels are slipping with respect to said rear wheels or when the rear wheels are slipping with respect to the front wheels;
   four-wheel slip detecting means responsive to said front-axle speed signal, said rear-axle speed signal and a vehicle body acceleration signal for producing a four-wheel slip signal only at non-existence of the two-wheel slip signal;
   actuator means responsive to said two-wheel slip signal for controlling said torque distribution ratio by controlling engagement of said clutch so as to reduce the torque to the slipping wheels;
   actuating means responsive to the four-wheel slip signal for actuating said throttle actuator so as to reduce the opening degree of the throttle valve;
   a vehicle body acceleration sensor for producing said vehicle body acceleration signal; and
   said vehicle body acceleration sensor comprises a rotational speed sensor of an output shaft of a transmission of said vehicle, said transmission being connected between said engine and an input member of said central differential.

* * * * *